(12) United States Patent
Guo et al.

(10) Patent No.: US 12,054,887 B2
(45) Date of Patent: Aug. 6, 2024

(54) PREPARATION METHOD OF DOUBLE-LAYER CARBON-PAPER BASE PAPER WITH HIGH UNIFORMITY AND GRADIENT PORES

(71) Applicant: ZHEJIANG UNIVERSITY OF SCIENCE AND TECHNOLOGY, Hangzhou (CN)

(72) Inventors: Daliang Guo, Hangzhou (CN); Lizheng Sha, Hangzhou (CN); Huifang Zhao, Hangzhou (CN); Jing Li, Hangzhou (CN); Yinchao Xu, Hangzhou (CN); Xin Zhang, Hangzhou (CN); Bei Liu, Hangzhou (CN); Tianzhong Yuan, Hangzhou (CN); Ziyang Chang, Hangzhou (CN); Qianyu Sun, Hangzhou (CN); Yahui Meng, Hangzhou (CN)

(73) Assignee: ZHEJIANG UNIVERSITY OF SCIENCE AND TECHNOLOGY, Zhejiang (CN)

( * ) Notice: Subject to any disclaimer, the term of this patent is extended or adjusted under 35 U.S.C. 154(b) by 0 days.

(21) Appl. No.: 18/327,080

(22) Filed: Jun. 1, 2023

(65) Prior Publication Data
US 2024/0044081 A1    Feb. 8, 2024

(30) Foreign Application Priority Data

Aug. 1, 2022   (CN) .......................... 202210915000.9

(51) Int. Cl.
  *D21H 13/50* (2006.01)
  *D21H 25/06* (2006.01)
(52) U.S. Cl.
  CPC ............ *D21H 13/50* (2013.01); *D21H 25/06* (2013.01)

(58) Field of Classification Search
  CPC .............................. D21H 13/50; D21H 25/06
  See application file for complete search history.

(56) References Cited

U.S. PATENT DOCUMENTS

2010/0255402 A1   10/2010   Heo et al.

FOREIGN PATENT DOCUMENTS

| CN | 103556543 A | 2/2014 |
| CN | 103709772 A | 4/2014 |

(Continued)

OTHER PUBLICATIONS

CNIPA, First Office Action issued for Chinese Application No. 202210915000.9, mailed Nov. 28, 2022 (16 pages).

(Continued)

*Primary Examiner* — Jacob T Minskey
*Assistant Examiner* — Stephen M Russell

(57) ABSTRACT

Disclosed is a preparation method of double-layer carbon-paper base paper with high uniformity and gradient pores, including adding carbon fibers to alkali lignin aqueous solution for treatment, controlling the alkali lignin aqueous solution to reach subcritical water conditions, and modifying the carbon fibers by sodium phenol reactive groups under the subcritical water conditions of the alkali lignin, for improving hydrophilic groups on a surface of the carbon fibers and a surface rough structure; further, modifying the carbon fibers to produce carbon nanotube clusters on the surface of the carbon fibers to obtain surface-thermally-modified carbon fibers, and adding the surface-thermally-modified carbon fibers to a dispersant for dispersion, stirring together with auxiliary materials to prepare a mixed slurry, and preparing the mixed slurry into the carbon-paper base paper by wet forming process.

6 Claims, 4 Drawing Sheets

(56) References Cited

FOREIGN PATENT DOCUMENTS

| CN | 106082159 | A |   | 11/2016 |
|----|-----------|---|---|---------|
| CN | 106971859 | A |   | 7/2017  |
| CN | 108642882 | A |   | 10/2018 |
| CN | 108914681 | A |   | 11/2018 |
| CN | 110512459 | A |   | 11/2019 |
| CN | 112726028 | A |   | 4/2021  |
| CN | 113322713 | A |   | 8/2021  |
| CN | 114181494 | A |   | 3/2022  |
| CN | 115262277 | B | * | 4/2023  |
| EP | 3561177   | A1|   | 10/2019 |
| JP | 2010037669| A |   | 2/2010  |

OTHER PUBLICATIONS

Notification to Grant Patent Right for Invention, Chinese Application No. 202210915000.9, mailed May 23, 2023 (2 pages).

Jianjie Qin, Study on the Continuous Growth of Carbon Nanotubes on Carbon Fiber Surfaces and their Reinforced Composites, "China Doctoral Dissertation Full-Text Database, Engineering and Technology vol. I", Issue 11, 2021, B020-27, Published Nov. 15, 2022 (189 pages).

Zhengyi Li et al., Preparation and capacitive properties of lignin-based carbon nanofibers, Carbon Techniques, vol. 37, Issue 3, 2018 (6 pages).

Bartosz Mielan et al., Comparison of the Properties of Lignins as Potential Carbon Precursors, Drewno, vol. 63, No. 206, 2020 (16 pages).

Zengbo Yi et al., Effect of Surface Treatment on Properties of Carbon Fiber and Reinforced Composites, Chinese Journal of Materials Research, vol. 29, Issue 1, Jan. 2015 (8 pages).

Chinese First Office Action, Chinese Application No. 202210915000.9, mailed Nov. 28, 2022.

Jianjie Qin, Study on the Continuous Growth of Carbon Nanotubes on Carbon Fiber Surfaces and their Reinforced Composites.

* cited by examiner

PREPARATION METHOD OF DOUBLE-LAYER CARBON-PAPER BASE PAPER WITH HIGH UNIFORMITY AND GRADIENT PORES

CROSS REFERENCE

The present disclosure is a continuation-application of International (PCT) Patent Application No. PCT/CN2022/111212, filed on Sep. 8, 2022, which claims priority of Chinese Patent Application No. 202210915000.9, filed on Aug. 1, 2022, the entire contents of which are hereby incorporated by reference in their entirety.

TECHNICAL FIELD

The present disclosure relates to the technical field of carbon fiber modification, and in particular to a preparation method of double-layer carbon-paper base paper with high uniformity and gradient pores.

BACKGROUND

The uniform dispersion of carbon fibers in water and wet forming process to achieve good interweaving between fibers is a prerequisite for the uniform thickness of carbon-paper base paper, and is also an important factor in determining the pore structure and basic strength characteristics of the carbon-paper base paper. However, due to the slender fibers and large aspect ratio of carbon fibers compared with natural plant fibers, the carbon fibers are easily entangled with each other and cannot be separated easily, which makes it difficult to disperse the fibers evenly in water and makes them easy to re-flocculate in the flow feed system, thus causing the uneven thickness and pore structure of carbon-paper base paper. The team showed that fiber length and suspension mass fraction are important factors affecting carbon fiber dispersion. In the dispersion system with 0.1% mass fraction, 60 ppm of dispersant, and 0.2% of surfactant, the length of 3-6 mm carbon fibers was optimally dispersed in water, and the uniformity of carbon-paper base paper was significantly improved. It can be seen that in order to produce carbon-paper base paper with uniform thickness, it is necessary to disperse carbon fibers in water evenly and with good dispersion stability. However, carbon fiber is an inert fiber material with carbon content higher than 95%, mainly composed of c-c bonds, with low surface energy and lack of reactive groups, which makes it difficult to be wetted with water, and it cannot be pulped to make the surface of carbon fiber to be filament fibrillated like plant fiber. In the process of dispersion, the carbon fibers tend to flocculate in water and produce flocs, which will lead to uneven dispersion of carbon fibers and affect the performance of carbon paper.

SUMMARY OF THE DISCLOSURE

The purpose of the present disclosure is to provide a preparation method of double-layer carbon-paper base paper with high uniformity and gradient pores. The carbon-paper base paper prepared by the present disclosure has the advantages of uniform thickness and pore structure, improving tensile strength and reducing resistivity of the base paper.

To solve the above technical problem, the present disclosure provides a preparation method of double-layer carbon-paper base paper with high uniformity and gradient pores, including:

S1: adding carbon fibers to alkali lignin aqueous solution for treatment, controlling the alkali lignin aqueous solution to reach subcritical water conditions, and modifying the carbon fibers by sodium phenol reactive groups under the subcritical water conditions of the alkali lignin, for improving hydrophilic groups on a surface of the carbon fibers and a surface rough structure;

S2: impregnating and coating the surface of the carbon fibers with nickel chloride hexahydrate, putting into a high-purity $N_2$ tube atmosphere furnace and evacuating for 5-15 min, warming up to 350-450° C., feeding 0.3-0.8 L/min hydrogen gas for catalyst reduction, and feeding a mixture of ethylene and hydrogen gas at 650-750° C. for a generation reaction of carbon nanotube cluster structure on the surface of the carbon fibers, with a reaction duration of 5-15 min, for obtaining surface-thermally-modified carbon fibers;

S3: adding the surface-thermally-modified carbon fibers to a dispersant and stirring together with auxiliary materials to prepare a mixed slurry; and S4: preparing the mixed slurry into the carbon-paper base paper by a wet forming process.

In some embodiments, the alkali lignin is prepared as 0.25-1 mol/L aqueous solution; the carbon fibers are added into the alkali lignin aqueous solution, and the alkali lignin aqueous solution is controlled to reach the subcritical water conditions under 150-200° C., a duration of the treatment is 20-70 min.

In some embodiments, a concentration of the alkali lignin aqueous solution is 0.25 mol/L, 0.5 mol/L, mol/L, or 1 mol/L; a temperature of the subcritical water conditions is 160° C., 170° C., 180° C., or 190° C.; the duration of the treatment is 30 min or 60 min.

In some embodiments, the S2 includes: impregnating and coating the surface of the carbon fibers with nickel chloride hexahydrate, putting into the high-purity $N_2$ tube atmosphere furnace and evacuating for min, warming up to 400° C., feeding 0.35 L/min hydrogen gas for catalyst reduction, and feeding the mixture of ethylene and hydrogen gas at 700° C. for the generation reaction of carbon nanotube cluster structure on the surface of the carbon fibers, with the reaction duration of 10 min, for obtaining the surface-thermally-modified carbon fibers.

In some embodiments, the mixed slurry is prepared by adding 1-2 portions of the surface-thermally-modified carbon fibers of 1-3 mm length by mass into 1-2 L of APAM solution of 0.5-1.5 portions/L by mass, and stirring for 20-40 minutes with a high-speed disperser; then adding 0.1-0.2 portions of polyvinyl alcohol and stirring continuously for 3-8 minutes to obtain the mixed slurry required for papermaking the base paper.

In some embodiments, the mixed slurry is prepared by adding 0.5-1.5 portions of the surface-thermally-modified carbon fibers of 7-9 mm length by mass and 0.01-0.1 portions of microfibrillated cellulose by mass to 1-2 L of APAM solution of 0.5-1.5 portions/L by mass, stirring for 20-40 minutes with a high-speed disperser, and adding 0.2-1 portions of microfibrillated polyvinyl alcohol fibers and stirring continuously for 3-8 minutes to obtain the mixed slurry for papermaking the base paper.

In some embodiments, the mixed slurry includes Pulp Mix A and Pulp Mix B;

wherein the Pulp Mix A is prepared by adding 1-2 portions of the surface-thermally-modified carbon fibers of 1-3 mm length by mass into 1-2 L of APAM solution of 0.5-1.5 portions/L by mass, and stirring for 20-40 minutes with a high-speed disperser; then adding 0.1-0.2 portions of polyvinyl alcohol and stirring continuously for 3-8 minutes;

wherein the Pulp Mix B is prepared by adding 0.5-1.5 portions of the surface-thermally-modified carbon fibers of 7-9 mm length by mass and 0.01-0.1 portions of microfibrillated cellulose by mass to 1-2 L of APAM solution of 0.5-1.5 portions/L by mass, stirring for 20-40 minutes with a high-speed disperser, and adding 0.2-1 portions of microfibrillated polyvinyl alcohol fibers and stirring continuously for 3-8 minutes;

wherein the Pulp Mix A and Pulp Mix B are prepared into wet paper web A and wet paper web B respectively, and the wet paper web A and wet paper web B are stacked to obtain a wet paper web of double-layer carbon-paper base paper with gradient pores;

the wet paper web is sandwiched between two sheets of silicone paper and dried to remove most of the moisture from the wet paper web to prevent the wet paper web from splitting during subsequent pressure drying;

the wet paper web is then placed in a flat vulcanizer for drying to obtain the double-layer carbon paper with gradient pores.

Compared with the related art, the present disclosure uses alkali lignin subcritical water conditions to modify carbon fibers with sodium phenol active groups, thereby improving the hydrophilic groups and surface rough structure of the carbon fiber surface, which is based on the mechanism that the alkali metal ions are not the key to oxygen migration, but the complexes formed by the alkali metal ions on the carbon surface play an important role as a medium. These two surface complex groups are in the form of phenol salt (—COM) and carboxylate (—CO2M), which will react with C to form hydrophilic groups and improve the surface roughness, thereby modifying the carbon fibers and making it have good dispersion in water. Further, the surface of carbon fiber is thermally modified by generating carbon nanotube cluster structure, and the surface-thermally-modified carbon fibers are used to prepare the carbon-paper base paper, which can further make the thickness and pore structure of the carbon-paper base paper uniform and increase the porosity, thereby improving the tensile strength and reducing the resistivity of the base paper.

DETAILED DESCRIPTION

The present disclosure is further described below in conjunction with the embodiments and the accompanying drawings, but is not intended to be a basis for limiting the present disclosure.

Embodiment: a preparation method of double-layer carbon-paper base paper with high uniformity and gradient pores, including the following steps.

S1: adding carbon fibers to alkali lignin aqueous solution for treatment, controlling the alkali lignin aqueous solution to reach subcritical water conditions, modifying the carbon fibers by sodium phenol reactive groups under the subcritical water conditions of the alkali lignin, for improving hydrophilic groups on a surface of the carbon fibers and a surface rough structure. The alkali lignin is prepared as 0.25 mol/L, 0.5 mol/L, 0.75 mol/L and 1 mol/L aqueous solutions. The carbon fibers are added into the alkali lignin aqueous solution, and the alkali lignin aqueous solution is controlled to reach the subcritical water conditions under 160° C., 170° C., 180° C. or 190° C., treated for 30 min or 60 min.

S2: impregnating and coating the surface of the carbon fibers with nickel chloride hexahydrate, putting into a high-purity $N_2$ tube atmosphere furnace and evacuating for 10 min, warming up to 400° C., feeding 0.35 L/min hydrogen gas for catalyst reduction, feeding a mixture of ethylene and hydrogen gas at 700° C. for a generation reaction of carbon nanotube cluster structure on the surface of the carbon fibers, with a reaction duration of 10 min.

S3: adding the surface-thermally-modified carbon fibers to a dispersant and stirring together with auxiliary materials to prepare a mixed slurry; specifically, the mixed slurry is prepared by adding 1-2 portions of surface-thermally-modified carbon fibers of 1-3 mm length by mass into 1-2 L of APAM solution of 0.5-1.5 portions/L by mass, and stirring for 20-40 minutes with a high-speed disperser; then adding 0.1-0.2 portions of polyvinyl alcohol and stirring continuously for 3-8 minutes to obtain the mixed slurry (hereinafter referred to as Pulp Mix A) required for papermaking the base paper.

In some embodiments, the mixed slurry is prepared by adding 0.5-1.5 portions of surface-thermally-modified carbon fibers of 7-9 mm length by mass and 0.01-0.1 portions of microfibrillated cellulose by mass to 1-2 L of APAM solution of 0.5-1.5 portions/L by mass, stirring for 20-40 minutes with a high-speed disperser, and adding 0.2-1 portions of microfibrillated polyvinyl alcohol fibers and stirring continuously for 3-8 minutes to obtain the mixed slurry (hereinafter referred to as Pulp Mix B) for papermaking the base paper.

Figure 1:
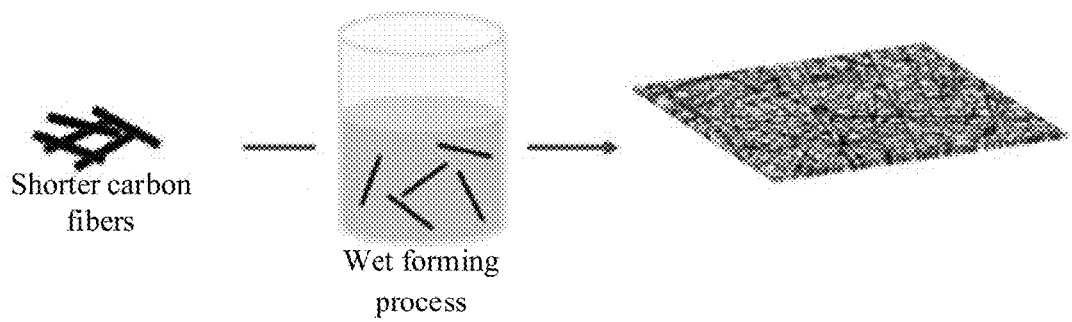
FIG. 1 is a schematic view of a preparation process of carbon-paper base paper prepared from shorter carbon fibers.
Figure 2:
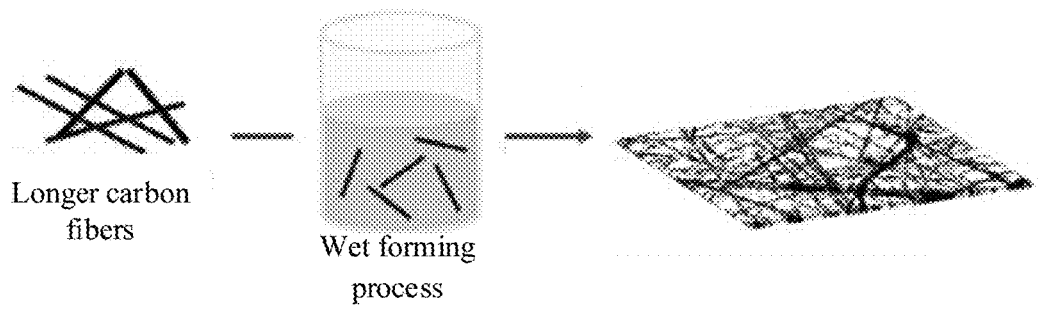
FIG. 2 is a schematic view of a preparation process of carbon-paper base paper prepared from longer carbon fibers.

S4: preparing the mixed slurry into the carbon-paper base paper by a wet forming process. Specifically, as shown in FIGS. 1 and 2, the Pulp Mix A or Pulp Mix B is introduced into a sheet former and an equal amount of water is poured into. A high-pressure water gun is dipped below the liquid surface to fully agitate the mixed slurry with the high-pressure water column, such that the carbon fibers are fully dispersed in the mixed slurry. Floating foam is removed from the top of the mixed slurry to remove both the foam that affects the sheet formation and the fiber bundles attached to the foam that affect the performance of the carbon paper. A filter valve of the sheet former is opened to allow the carbon fibers in the mixed slurry to settle freely on a metal mesh to form a wet paper web of carbon paper; the wet paper web is placed upside down on silicone paper and excess water is removed from the web with a filter paper. The wet paper web is removed and sandwiched between two sheets of silicone paper, and is dried in a flatbed dryer at 105° C. for 3 minutes to remove most of the moisture from the wet paper web of the carbon-paper base paper, thereby preventing the wet paper web from splitting during subsequent pressure drying. Finally, the wet paper web is placed in a plate vulcanizer and dried at 130° C. for 20 minutes under a pressure of 0.5 MPa, to obtain the carbon-paper base paper.

Figure 3:
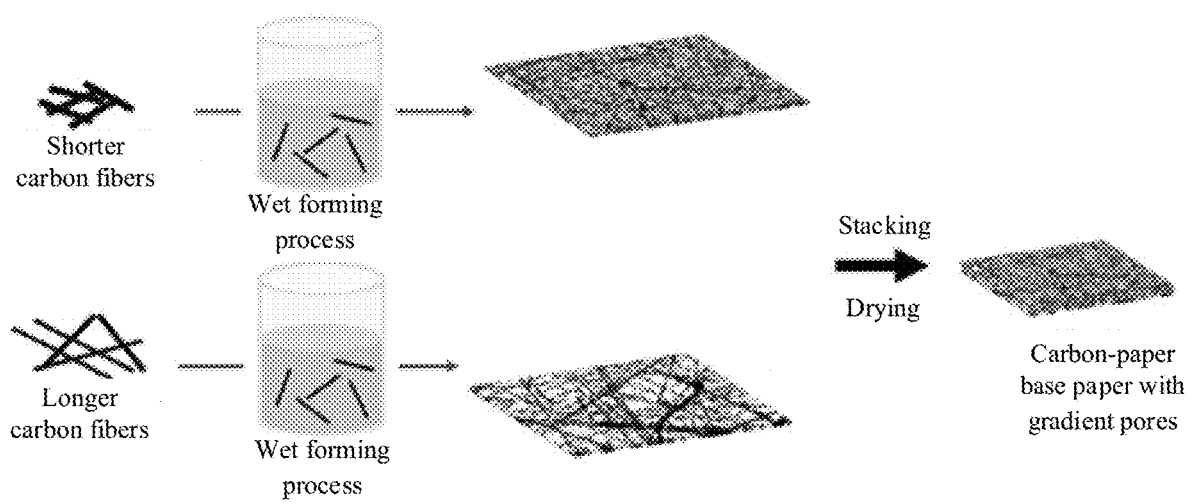
FIG. 3 is a schematic view of a preparation process of double-layer carbon-paper base paper.

In other embodiments, as shown in FIG. 3, the Pulp Mix A and Pulp Mix B are prepared into wet paper web A and wet paper web B respectively, and the wet paper web A and wet paper web B are stacked to obtain a wet paper web of double-layer carbon-paper base paper with gradient pores. The wet paper web is sandwiched between two sheets of silicone paper and dried to remove most of the moisture from the wet paper web to prevent the wet paper web from splitting during subsequent pressure drying; the wet paper web is then placed in a flat vulcanizer for drying to obtain the double-layer carbon paper with gradient pores.

Figure 4:
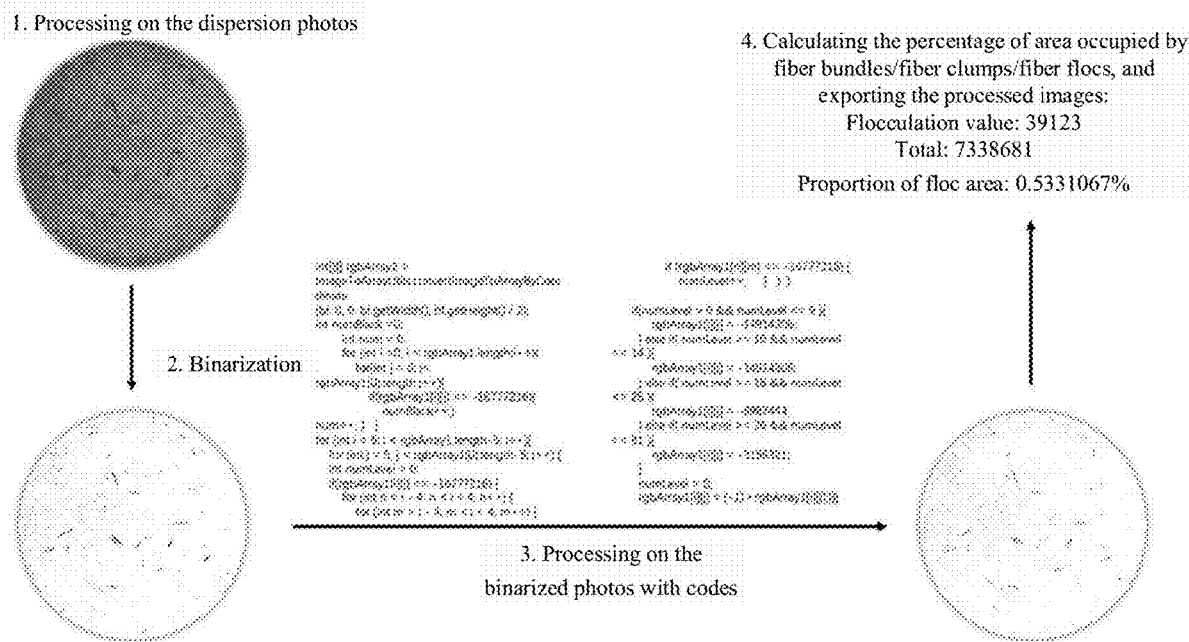
FIG. 4 is a flowchart of evaluating a dispersion effect of carbon fibers.

In order to verify the beneficial effect of the present disclosure, the applicant takes photos and processes the photos of the carbon fiber mixed slurry by software to evaluate the carbon fiber dispersion effect (as shown in FIG. 4); uses a multiple light scattering instrument to test the stability index of the mixed slurry to evaluate the stability of the mixed slurry; prepares the mixed slurry into carbon paper by the wet forming process, and uses a uniformity meter, a permeability tester, a four-probe tester, and a horizontal paper tensile strength tester to evaluate the performance of the carbon paper. The performance of the carbon paper is evaluated through the data, and the dispersion effect of the carbon fiber is indirectly evaluated through the dispersion coefficient of the data measured at different locations of the same paper.

Figure 5:
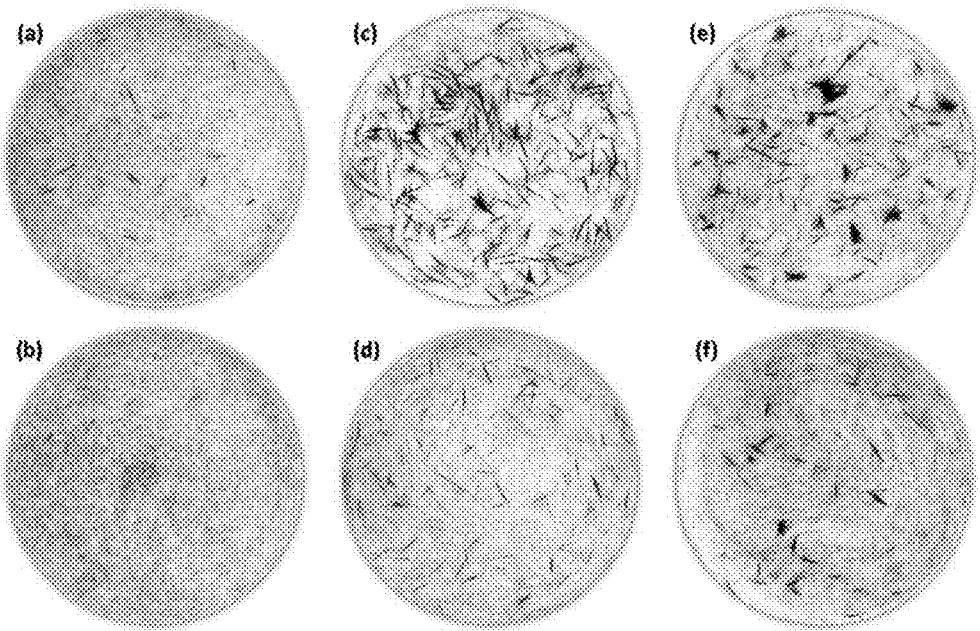
FIG. 5 is a schematic view of suspensions obtained from dispersion of carbon fibers with and without pretreatment.
Figure 6:
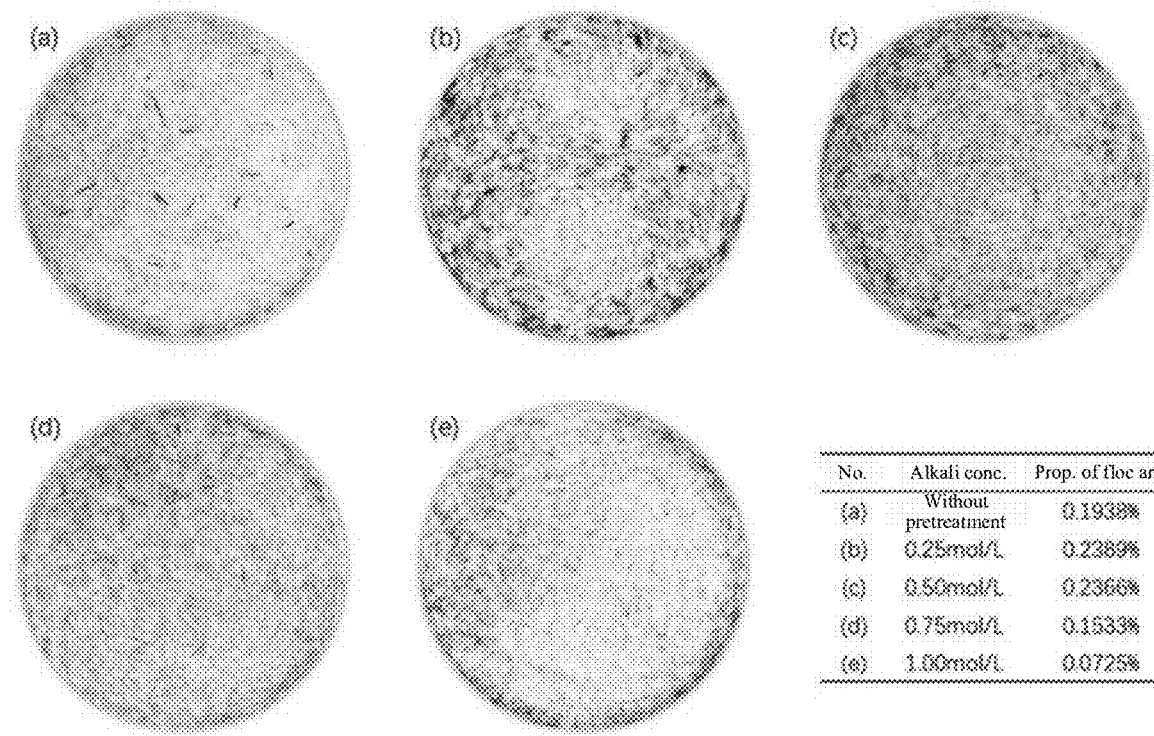
FIG. 6 is a schematic view showing the effect of different alkali lignin concentrations on carbon fiber dispersion.
Figure 7:
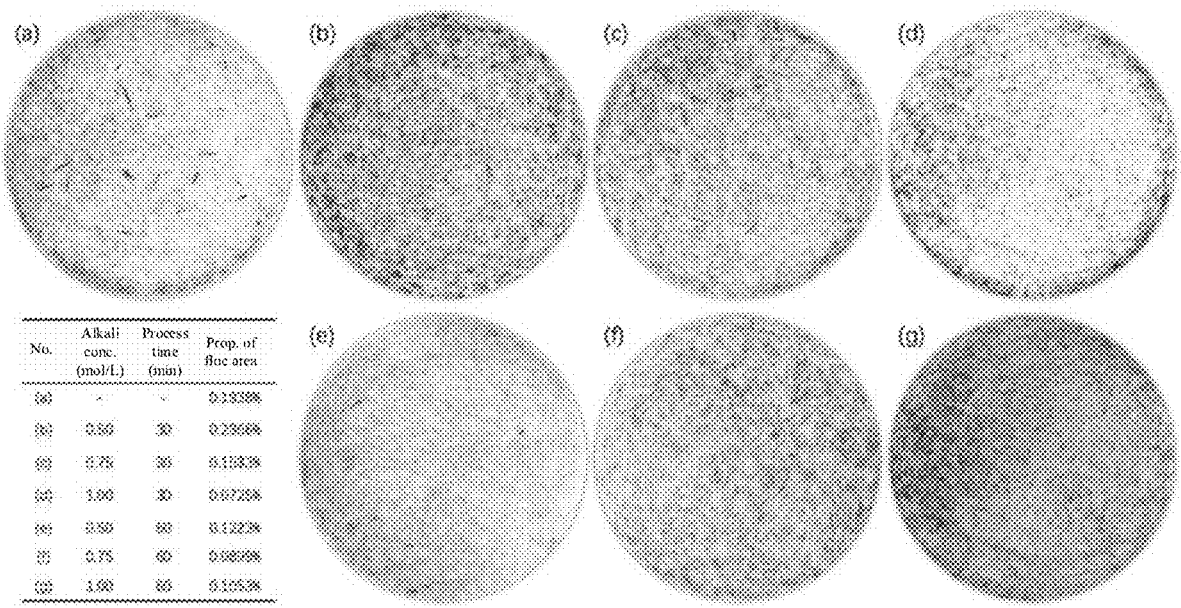
FIG. 7 is a schematic view showing the effect of different treatment time on carbon fiber dispersion.
Figure 8:
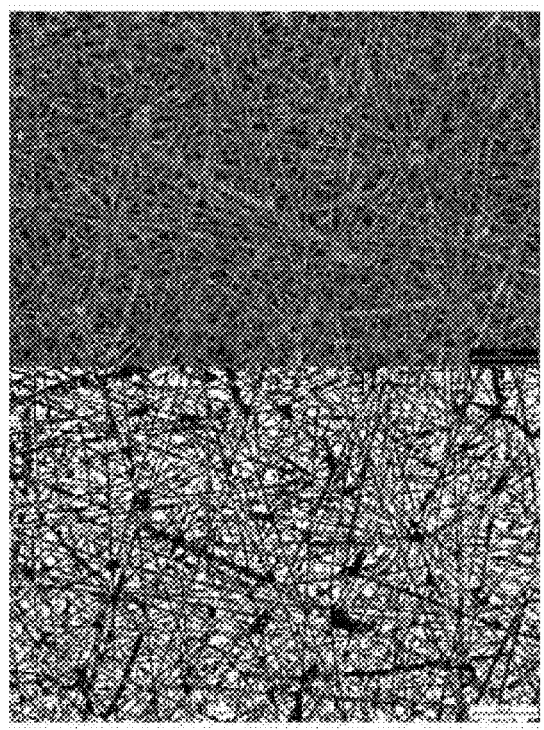
FIG. 8 is a microscopic view of carbon-paper base paper prepared from 2 mm surface-thermally-modified carbon fibers (Pulp Mix A).
Figure 9:
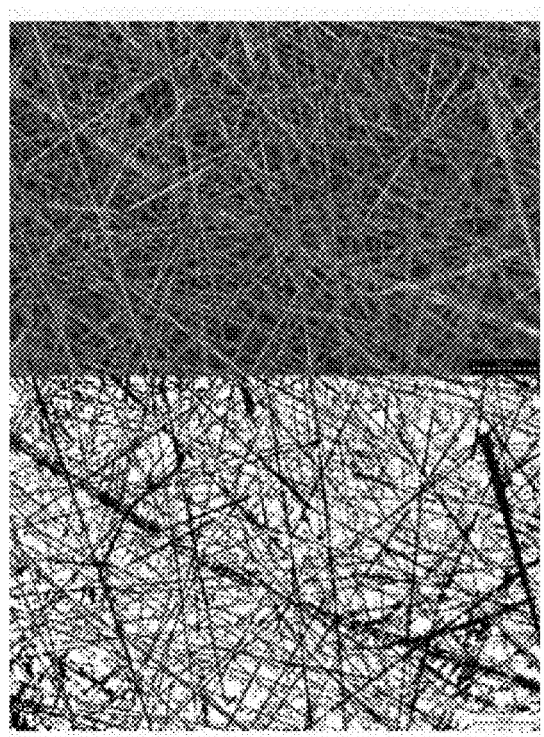
FIG. 9 is a microscopic view of carbon-paper base paper prepared from 8 mm surface-thermally-modified carbon fibers (Pulp Mix B).

FIG. 5 shows the suspensions obtained from dispersion of carbon fibers with pretreatment (the pretreatment described below is treating the carbon fibers under the alkaline lignin subcritical water conditions in step S1) and without pretreatment, where a corresponds to untreated 4 mm carbon fibers, b corresponds to treated 4 mm carbon fibers, c corresponds to untreated 6 mm carbon fibers, d corresponds to treated 6 mm carbon fibers, e corresponds to untreated 8 mm carbon fibers, and f corresponds to treated 8 mm carbon fibers. It can be seen that the dispersion effect of different lengths of carbon fibers is improved after the treatment of the present disclosure. FIG. 6 shows the effect of different alkali lignin concentrations on carbon fiber dispersion, where a corresponds to untreated carbon fibers, b corresponds to the carbon fibers treated with 0.25 mol/L alkali lignin, c corresponds to carbon fibers treated with 0.50 mol/L alkali lignin, d corresponds to carbon fibers treated with 0.75 mol/L alkali lignin, and e corresponds to carbon fibers treated with 1 mol/L alkali lignin. It can be seen that the dispersion effect further increases with the increase of alkali lignin concentration. FIG. 7 shows the effect of different treatment time on the carbon fiber dispersion, where a corresponds to untreated carbon fibers, b corresponds to carbon fibers treated with 0.50 mol/L alkali lignin for 30 min, c corresponds to carbon fibers treated with 0.75 mol/L alkali lignin for 30 min, d corresponds to carbon fibers treated with 1 mol/L alkali lignin for 30 min, e corresponds to carbon fibers treated with 0.50 mol/L alkali lignin for 30 min, f corresponds to carbon fibers treated with 0.75 mol/L alkali lignin for 60 min, g corresponds to carbon fibers treated with 1 mol/L alkali lignin for 60 min. It can be seen that the longer the treatment time of alkali lignin with concentration below 1 mol/L, the better the dispersion effect. The best dispersion effect is achieved at 30 min of treatment with 1 mol/L alkaline lignin. FIG. 8 shows the microscopic view of carbon-paper base paper prepared by 2 mm surface-thermally-modified carbon fibers (Pulp Mix A), and FIG. 9 shows the microscopic view of carbon-paper base paper prepared by 8 mm surface-thermally-modified carbon fibers (Pulp Mix B). The carbon-paper base paper made from the 2 mm surface-thermally-modified carbon fibers (Pulp Mix A) has more small-size pores, and the carbon-paper base paper made from the 8 mm surface-thermally-modified carbon fiber (Pulp Mix B) has more large-size pores, and the pore uniformity of these two kinds of carbon-paper base paper (A and B) and the double-layer carbon-paper base paper with gradient pore size (C) made in the embodiments with the carbon-paper base paper (D) prepared by commercially available companies for porosity, permeability, tensile index, thickness, and electrical conductivity, and the results are described in Table 1 below:

|  | A | B | C | D |
|---|---|---|---|---|
| Porosity % | 93.4 | 93.2 | 92.4 | 91.0 |
| Permeability mm/S | 3490 | 3720 | 3250 | 1690 |
| Tensile index KN/m | 2.49 | 3.14 | 2.15 | 1.54 |
| Thickness mm | 0.1754 | 0.1697 | 0.171 | 0.239 |
| Electrical conductivity S/m | 1468 | 1534 | 1435 | 506 |

From Table 1, it can be seen that the carbon-paper base paper prepared by the present disclosure has good performance in porosity, permeability, tensile index, thickness, and electrical conductivity, and has a large improvement compared with the carbon-paper base paper prepared by the commercially available companies, which indicates that the present disclosure uses the alkali lignin subcritical water condition to modify the carbon fibers with sodium phenol reactive group, which improves the hydrophilic group and surface rough structure of the carbon fiber, such that it has good dispersion in water. Further, the surface of carbon fiber is thermally modified by generating carbon nanotube cluster structure, and the surface-thermally-modified carbon fibers are used to prepare the carbon-paper base paper, which can further make the thickness and pore structure of the carbon-paper base paper uniform and increase the porosity, thereby improving the tensile strength and reducing the resistivity of the base paper.

What is claimed is:

1. A preparation method of double-layer carbon-paper base paper with high uniformity and gradient pores, comprising:
   S1: adding carbon fibers to alkali lignin aqueous solution for treatment, controlling the alkali lignin aqueous solution to reach subcritical conditions, and modifying the carbon fibers by sodium phenol reactive groups under the subcritical conditions of the alkali lignin aqueous solution, for improving hydrophilic groups on a surface of the carbon fibers and a surface rough structure;
   S2: impregnating and coating the surface of the carbon fibers with nickel chloride hexahydrate, putting into a high-purity $N_2$ tube atmosphere furnace and evacuating for 5-15 min, warming up to 350-450° C., feeding 0.3-0.8 L/min hydrogen gas for catalyst reduction, and feeding a mixture of ethylene and hydrogen gas at 650-750° ° C. for a generation reaction of carbon nanotube cluster structure on the surface of the carbon fibers, with a reaction duration of 5-15 min, for obtaining surface-thermally-modified carbon fibers;

S3: adding the surface-thermally-modified carbon fibers to a dispersant and stirring together with auxiliary materials to prepare a mixed slurry; and S4: preparing the mixed slurry into the carbon-paper base paper by a wet forming process;

wherein the alkali lignin is prepared as 0.25-1 mol/L aqueous solution; the carbon fibers are added into the alkali lignin aqueous solution, and the alkali lignin aqueous solution is controlled to reach the subcritical conditions under 150-200° C., a duration of the treatment is 20-70 min.

2. The preparation method according to claim 1, wherein a concentration of the alkali lignin aqueous solution is 0.25 mol/L, 0.5 mol/L, 0.75 mol/L, or 1 mol/L; a temperature of the subcritical conditions is 160° C., 170° C., 180° C., or 190° C.; the duration of the treatment is 30 min or 60 min.

3. The preparation method according to claim 1, wherein the S2 comprises:

impregnating and coating the surface of the carbon fibers with nickel chloride hexahydrate, putting into the high-purity $N_2$ tube atmosphere furnace and evacuating for 10 min, warming up to 400° C., feeding 0.35 L/min hydrogen gas for catalyst reduction, and feeding the mixture of ethylene and hydrogen gas at 700° ° C. for the generation reaction of carbon nanotube cluster structure on the surface of the carbon fibers, with the reaction duration of 10 min, for obtaining the surface-thermally-modified carbon fibers.

4. The preparation method according to claim 1, wherein the mixed slurry is prepared by adding 1-2 portions of the surface-thermally-modified carbon fibers of 1-3 mm length by mass into 1-2 L of APAM solution of 0.5-1.5 portions/L by mass, and stirring for 20-40 minutes with a high-speed disperser; then adding 0.1-0.2 portions of polyvinyl alcohol and stirring continuously for 3-8 minutes to obtain the mixed slurry required for papermaking the base paper.

5. The preparation method according to claim 1, wherein the mixed slurry is prepared by adding 0.5-1.5 portions of the surface-thermally-modified carbon fibers of 7-9 mm length by mass and 0.01-0.1 portions of microfibrillated cellulose by mass to 1-2 L of APAM solution of 0.5-1.5 portions/L by mass, stirring for 20-40 minutes with a high-speed disperser, and adding 0.2-1 portions of microfibrillated polyvinyl alcohol fibers and stirring continuously for 3-8 minutes to obtain the mixed slurry for papermaking the base paper.

6. The preparation method according to claim 1, wherein the mixed slurry comprises Pulp Mix A and Pulp Mix B;

wherein the Pulp Mix A is prepared by adding 1-2 portions of the surface-thermally-modified carbon fibers of 1-3 mm length by mass into 1-2 L of APAM solution of 0.5-1.5 portions/L by mass, and stirring for 20-40 minutes with a high-speed disperser; then adding 0.1-0.2 portions of polyvinyl alcohol and stirring continuously for 3-8 minutes;

wherein the Pulp Mix B is prepared by adding 0.5-1.5 portions of the surface-thermally-modified carbon fibers of 7-9 mm length by mass and 0.01-0.1 portions of microfibrillated cellulose by mass to 1-2 L of APAM solution of 0.5-1.5 portions/L by mass, stirring for 20-40 minutes with a high-speed disperser, and adding 0.2-1 portions of microfibrillated polyvinyl alcohol fibers and stirring continuously for 3-8 minutes;

wherein S4 comprises:

preparing the Pulp Mix A and Pulp Mix B into wet paper web A and wet paper web B respectively, and stacking the wet paper web A and wet paper web B to obtain a wet paper web of double-layer carbon-paper base paper with gradient pores;

sandwiching the wet paper web between two sheets of silicone paper and dried to remove most of the moisture from the wet paper web to prevent the wet paper web from splitting during subsequent pressure drying; and placing the wet paper web in a flat vulcanizer for drying to obtain the double-layer carbon paper with gradient pores.

* * * * *